United States Patent [19]
Sato

[11] Patent Number: 5,557,636
[45] Date of Patent: Sep. 17, 1996

[54] METHOD AND SYSTEM OF OPERATING REDUNDANT TRANSMISSION LINE

[75] Inventor: Kazumi Sato, Kawasaki, Japan

[73] Assignee: Fujitsu Limited, Kanagawa, Japan

[21] Appl. No.: 297,147

[22] Filed: Aug. 29, 1994

[30] Foreign Application Priority Data

Mar. 16, 1994 [JP] Japan .................................. 6-046194

[51] Int. Cl.⁶ ............................... G06F 11/20; H04L 1/22
[52] U.S. Cl. ...................... 375/260; 455/103; 395/182.11
[58] Field of Search ......................... 375/38, 260; 455/39, 455/49.1, 59, 103; 359/154, 180; 371/8.2, 11.2; 395/182.08, 182.09, 182.11

[56] References Cited

U.S. PATENT DOCUMENTS 4,984,252  1/1991  Morimoto ................................. 375/38
5,311,551  5/1994  Eng ............................................ 375/38

FOREIGN PATENT DOCUMENTS 067252   5/1980   Japan ...................................... 455/103
198933  10/1985   Japan ...................................... 371/8.2

Primary Examiner—Stephen Chin
Assistant Examiner—Jeffrey W. Gluck

[57] ABSTRACT

A clock signal or the power is constantly supplied to an interface board used in an active system. The power is supplied to a transmission line signal processing part, for processing a signal from a transmission line, of an interface board used in a reserve system at a predetermined cycle. The power is not supplied to a reserve transmission line of the interface board used in the reserve system.

15 Claims, 16 Drawing Sheets

FIG. 8A
FIG. 8B
FIG. 8C
FIG. 8D
FIG. 8E
FIG. 8F
H : ACTIVE
L : RESERVE 5,557,636

1

METHOD AND SYSTEM OF OPERATING REDUNDANT TRANSMISSION LINE

BACKGROUND OF THE INVENTION

The present invention relates to methods and systems of operating a redundant transmission line, and more particularly to a method and system of operating a redundant transmission line having a redundant construction formed of a multiplexing redundant unit or the like.

In a conventional transmission system having an active system and a reserve system which is formed of optical interface boards using a multiplexing transmission unit or a cross connect, the reserve optical interface board performs the same process as the active optical interface board. This arrangement comes from a need to always stand by for a failure in the active system. However, in a majority of cases, there is no need to use a reserve system, and the active system meets all the operating needs. For this reason, it will be possible to reduce the power consumption of the reserve system by allowing the reserve system to carry out processes less frequently than the active system. The focus of the present invention is to limit the power supply to the reserve system, which is actually used relatively infrequently, so that the power consumption of the entire transmission apparatus having a redundant construction is reduced.

FIG.1 shows the redundant construction of a conventional transmission system. It is assumed that the transmission apparatus A and the transmission apparatus B shown in the figure are of the same construction. Each of the transmission apparatuses A and B includes an active optical interface board 100a, a reserve optical interface board 100b, a selection part 200 for switching the optical interface boards 100a and 100b to either an active system or to a reserve system, and a power supply part 300 for supplying the power to the optical interface boards 100a and 100b.

FIG.2 shows the construction of the optical interface board in the conventional transmission apparatus. The optical interface board 100a (100b) includes an optical/electrical signal conversion part (O/E) 130, an electrical/optical signal conversion part (E/O) 140, a transmission line signal processing part 110, and an apparatus interface 120.

The O/E 130 converts a 150 Mbit or 50 Mbit optical signal transmitted via a transmission line into an electrical signal. The E/O 140 converts an electrical signal from the transmission line signal processing part 110 to an optical signal and forwards the optical signal to the transmission line.

The transmission line signal processing part 110 includes: a frame synchronization part 111, a transmission line error detection part 112, an overhead detection part 113, a pointer detection part 114, a transmission error detection signal attachment part 115, an overhead attachment process part 116, and a pointer attachment process part 117. FIG.3 shows the construction of the apparatus interface within the conventional transmission apparatus. The apparatus interface 120 includes an apparatus pointer processing part 121, an apparatus error detection signal attachment part 122, a frame timing stamp (FTS) attachment part 123, an FTS detection part 124, an apparatus error detection part 125 and an apparatus pointer detection part 126.

Referring to FIG. 1, the selection part 200 makes a determination as to whether an optical interface board is to be used in the active system or the reserve system. In the example shown in the figure, the optical interface board 100a is allocated to the active system, and the optical

2 interface board 100b is allocated to the reserve system. A description will be given, with reference to FIGS.2 and 3, of the operation executed when the transmission apparatus A is a sender and the transmission apparatus B is a receiver. The sender transmission apparatus A accepts a signal delivered from within the apparatus via the apparatus interface 120. The apparatus interface 120 attaches a pointer, an overhead and transmission line switching information to the data by means of the apparatus pointer processing part 121, before sending the data to the apparatus error detection signal attachment part 122. The apparatus error detection signal attachment part 122 processes the data so as to attach thereto a transmission line error detection signal, before sending the data to the frame timing stamp attachment part 123. The frame timing stamp part 123 attaches a frame timing stamp to the signal to be transmitted, before sending the signal to the receiver transmission apparatus B.

The receiver transmission apparatus B receives the signal from the sender transmission apparatus A via the transmission line. The O/E part 130 of the transmission apparatus B receives an input of the 150 Mbit/s or 50 Mbit/s optical signal from the transmission line and subjects the signal to optical/electrical conversion. Thereafter, the signal is input to the transmission line signal processing part 110. It is to be noted that a serial optical signal input from the transmission line is converted into a parallel signal. The frame synchronization part 111 synchronizes the signal which has been converted into a parallel signal. After the synchronization, the frame synchronization part 111 outputs the parallel signal to the transmission line error detection part 112. The transmission line error detection part 112 checks the signal input from the transmission line for a failure in the transmission line, and sends the result to the overhead detection processing part 113. The overhead detection processing part 113 detects an overhead in the signal, and sends the result to the pointer detection processing part 114. The pointer detection processing part 114 detects a pointer in the frame, and sends the result to the apparatus interface 120.

The receiver transmission apparatus receives a signal transmitted from the transmission line signal processing part 110 via the apparatus interface 120. The frame timing stamp detection part 124 detects a frame timing stamp in the received signal. The signal is then sent to the apparatus error detection part 125. The apparatus error detection part 125 detects an error in the signal, and sends the signal to the pointer detection signal 126. The pointer detection part 126 detects a pointer in the signal, and transfers the signal to the apparatus.

In the transmission apparatuses A and B, the active optical interface board 100a and the reserve optical interface board 100b perform the same process. Referring to FIG. 1, the signal sent from the active optical interface board 100a of the transmission apparatus A is transmitted via an active transmission line 20 and is input to the active optical interface board 100a of the transmission apparatus B. The signal sent from the reserve optical interface board 100b of the transmission apparatus A is transmitted via a reserve transmission line 30 and is input to the reserve optical interface board 100b of the transmission apparatus B.

In the transmission apparatuses having a redundant construction as shown in FIG. 1, the power supply part 300 supplies the power to the active optical interface board 100a and the reserve optical interface board 100b so that the active optical interface board 100a and the reserve optical interface board 100b can be operated. The power from the power supply part 300 is evenly supplied to the optical interface boards 100a and 100b. Accordingly, the power is supplied to the active and reserve optical interface boards 100*a* and 100*b* at a ratio of 1:1.

Since the above described conventional method of operating the transmission line allows the power to be evenly supplied to the active optical interface board and to the reserve optical interface board, and the reserve optical interface board and the active optical interface board perform in an identical manner in processing the signal transmitted on a transmission line, there is a problem in that the power supplied to the reserve system is wasted when the active system is being normally operated.

SUMMARY OF THE INVENTION

Accordingly, a general object of the present invention is to provide a method of operating a redundant transmission line by which method the above mentioned problems of the conventional technology are resolved, and the reduction of the power consumption in the reserve optical interface board can be achieved.

A more specific object of the present invention is to provide a method of operating a redundant transmission line by which method it is possible to supply a clock signal to the reserve optical interface board at a predetermined cycle.

Another and more specific object of the present invention is to provide a method of operating a redundant transmission line by which method it is possible to supply the power to the reserve optical interface board at a predetermined cycle.

The aforementioned objects of the present invention can be accomplished by providing a system of operating a transmission line having a redundant construction having a transmission line control apparatus formed of two interface boards. One interface board is used in an active system and the other is used in a reserve system. Each of the interface boards has transmission line signal processing means for processing a signal input via a transmission line and a reserve transmission line for implementing an interface between the interface board and a transmission control apparatus. The transmission control apparatus comprises active/reserve control means for constantly supplying power to the active interface board, and for effecting control for supplying power at least to the transmission line signal processing means of the reserve interface board. Each of the interface boards comprises power supply control means for switching the interface board to the active system or to the reserve system in response to the control action by the active/reserve control means, so that power is constantly supplied to the interface board switched to the active system, and so that power is supplied to at least the transmission line signal processing means of the interface board switched to the reserve system.

In accordance with another aspect of the present invention, there is provided a method of operating a redundant transmission line using a transmission control apparatus having a redundant construction, wherein the power is constantly supplied to an active interface board which implements an interface between an active transmission line and a transmission apparatus, and the power is supplied to a reserve interface board which implements an interface between a reserve transmission line and a transmission apparatus, at a predetermined cycle.

In accordance with yet another aspect of the present invention, there is provided a method of operating a redundant transmission line using a transmission control apparatus having a redundant construction, wherein the power is constantly supplied to an active interface board which implements an interface between an active transmission line and a transmission apparatus, and the power is constantly supplied to a transmission line signal processing part, for processing a signal from a transmission line, of a reserve interface board which implements an interface between a reserve transmission line and a transmission apparatus, the power not being supplied to parts other than the transmission line signal processing part.

In further accordance with the present invention, there is provided a method of operating a redundant transmission line using a transmission control apparatus having a redundant construction, wherein the power is constantly supplied to an active interface board which implements an interface between an active transmission line and a transmission apparatus, and the power is constantly supplied to a transmission line signal processing part of a reserve interface board which implements an interface between a reserve transmission line and a transmission apparatus, the power being supplied to a reserve transmission line of the reserve interface board at a predetermined cycle.

According to one aspect of the present invention, the power or the clock signal is constantly supplied to the active interface board which implements an interface between the active transmission line and the transmission apparatus. The power or the clock signal is supplied to the reserve interface board which implements an interface between the reserve transmission line and the transmission apparatus, at a predetermined cycle, thus ensuring that the reserve system is operated only during intervals in which the clock signal or the power is supplied thereto. This arrangement whereby the power or the clock signal is not constantly supplied to the reserve system ensures that the power is not consumed in the interface board used in the reserve system while the clock signal or the power is not supplied thereto.

According to another aspect of the present invention, while the active interface board carries out a normal transmission line signal processing, the power or the clock signal is supplied only to the transmission line signal processing part of the reserve interface board at a predetermined cycle, the clock signal or the power not being supplied to the reserve transmission line of the reserve interface board, thereby further reducing the power consumption of the reserve system.

According to yet another aspect of the present invention, while the clock signal or the power is constantly supplied to the active interface board, the clock signal or the power is supplied only to the transmission line signal processing part of the reserve interface board, the clock or the power is supplied to the reserve transmission line of the reserve interface board at a predetermined cycle. Since the reserve transmission line is not continuously supplied with the clock or the power, the power consumption of the reserve interface board can be reduced during intervals in which the clock or the power is not supplied thereto.

BRIEF DESCRIPTION OF THE DRAWINGS

Other objects and further features of the present invention will be apparent from the following detailed description when read in conjunction with the accompanying drawings, in which:

FIG. 8 is a time chart of signals occurring in the apparatus of the first embodiment;

DESCRIPTION OF THE PREFERRED EMBODIMENTS

A description will now be given, with reference to the attached drawings, of the preferred embodiments of the present invention.

Figure 1:
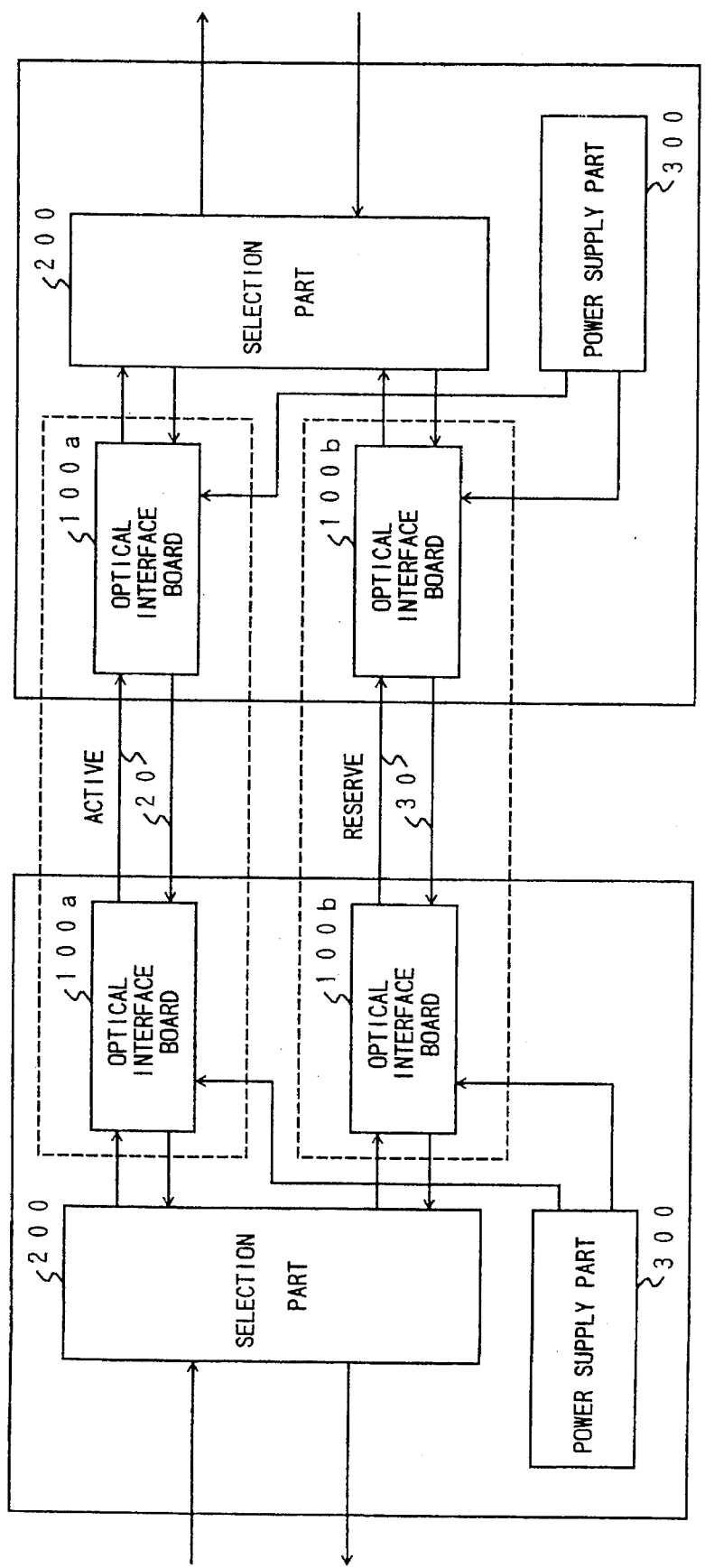
FIG. 1 is a diagram showing a redundant construction of a conventional transmission system.
Figure 2:
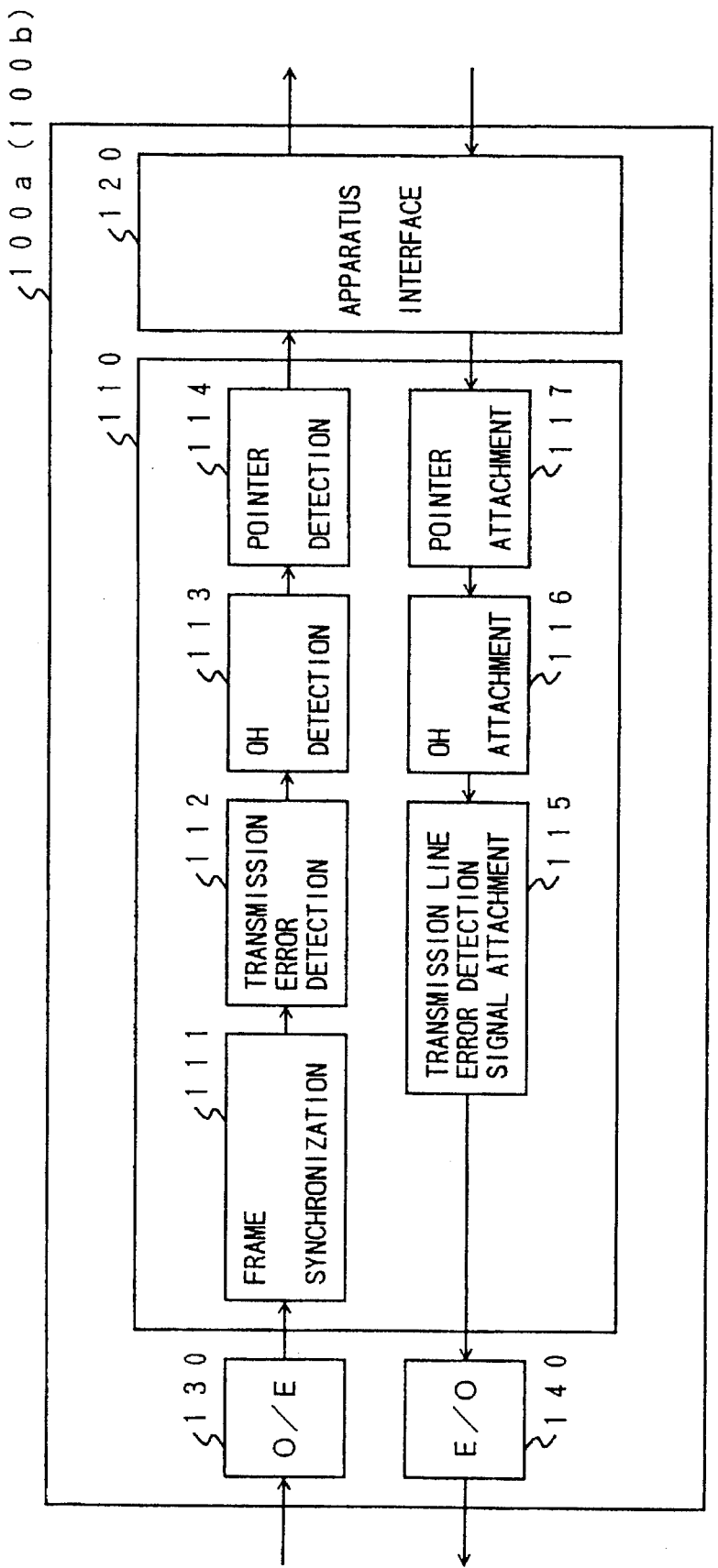
FIG. 2 is a diagram showing the construction of an optical interface board in the conventional transmission apparatus.
Figure 3:
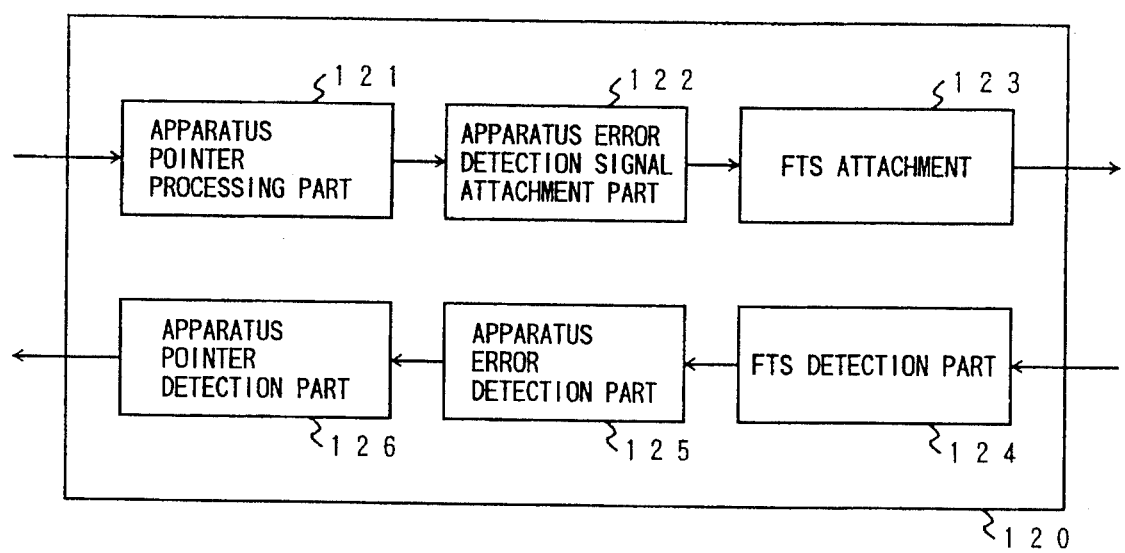
FIG. 3 is a diagram showing the construction of an apparatus interface in the conventional transmission apparatus.
Figure 4:
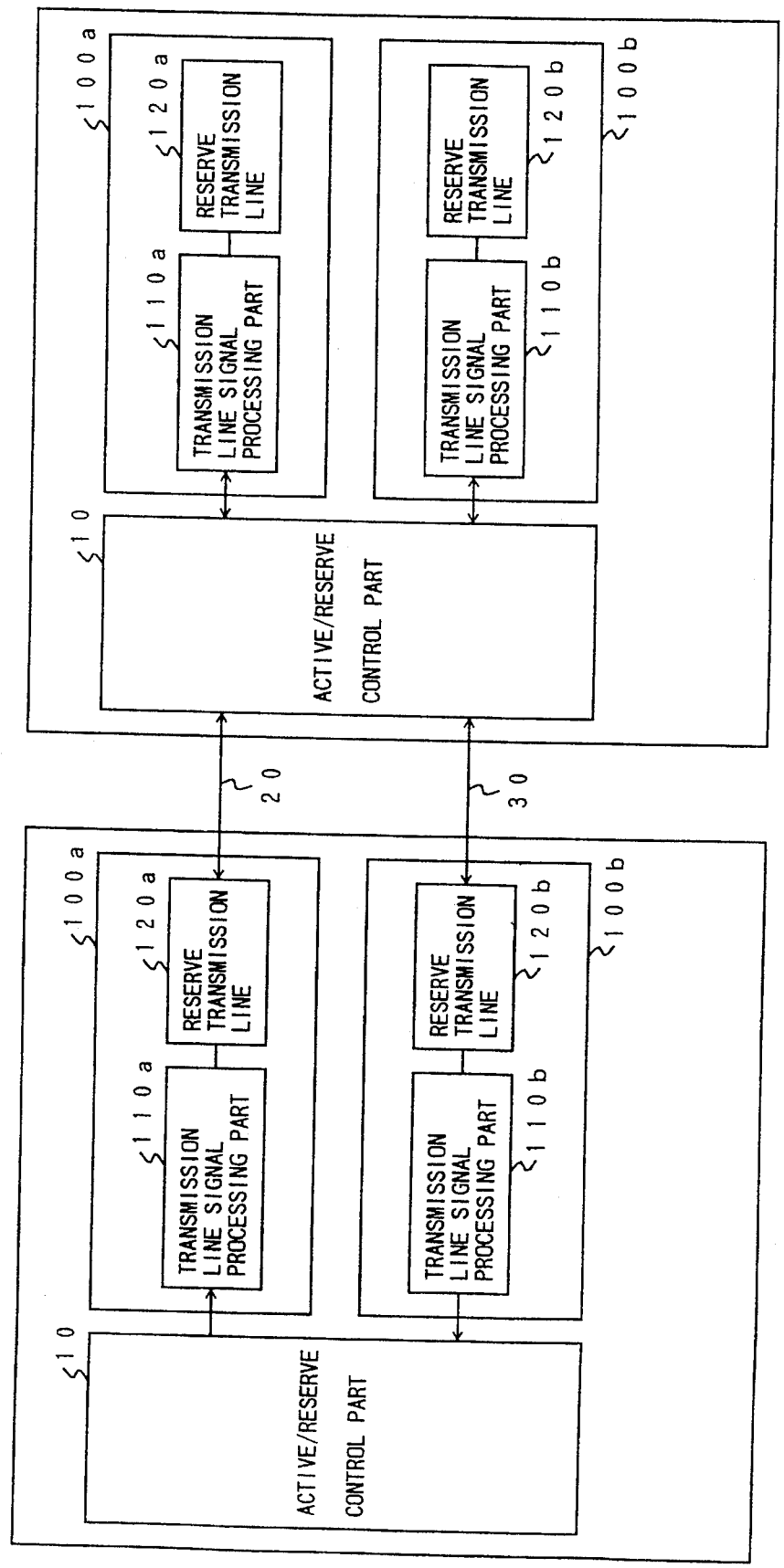
FIG. 4 is a system block diagram of the present invention.
Figure 5A:
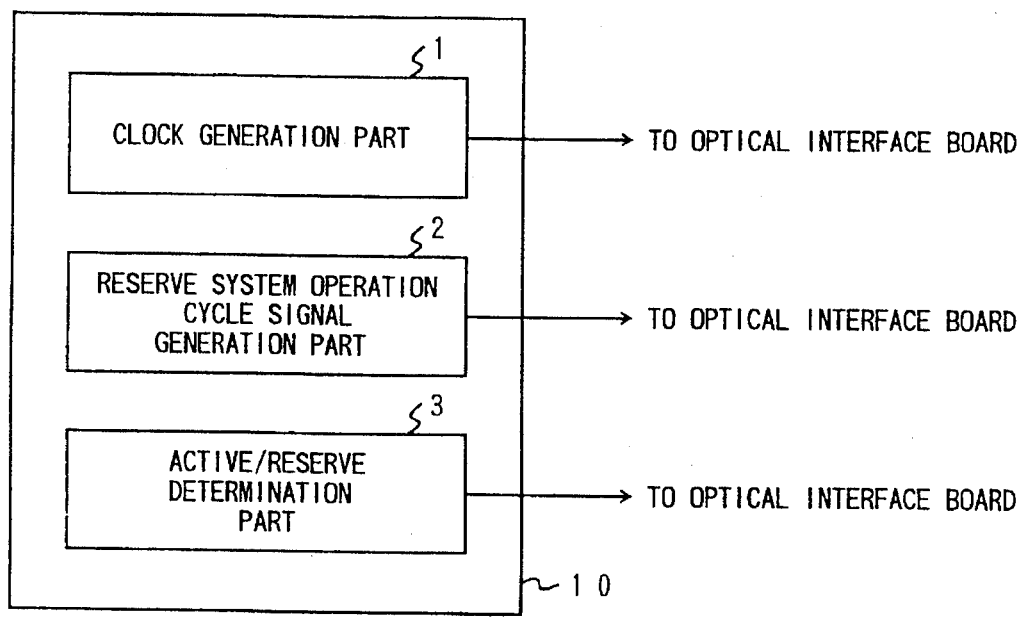
FIGS. 5A and 5B are diagrams showing the construction of active/reserve control part.
Figure 5B:
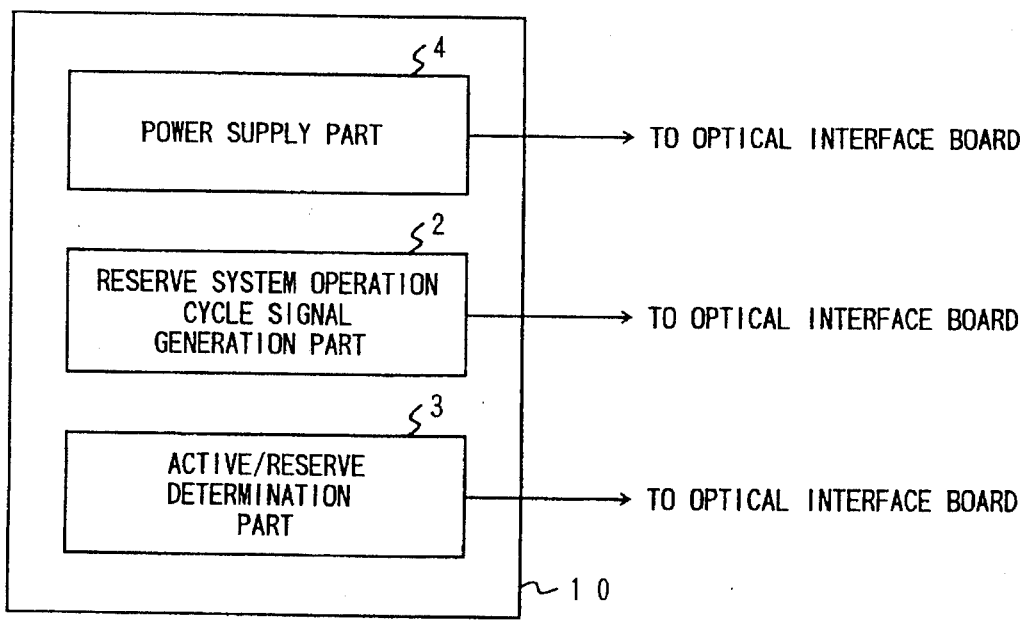

FIG. 4 shows a system construction of the present invention. Each of the transmission apparatuses A and B includes an active/reserve control part 10, an active optical interface board 100a and a reserve optical interface board 100b. FIG. 5A shows that the active/reserve control part 10 includes a clock generation part 1, a reserve system operation cycle signal generation part 2 for generating a cycle signal which controls the cycle at which the clock signal generated by the clock generation part 1 is supplied to the reserve optical interface board 100b, and an active/reserve determination part 3 for determining whether an optical interface board is to be used in the active system or the reserve system. As shown in FIG. 5B, the active/reserve control part 10 may be configured such that the power supply part 4 instead of the clock generation part 1 is provided and such that the power is supplied from the power supply part 4 to the optical interface board 100a (100b). The construction of the active optical interface board 100a and the reserve optical interface board 100b is the same as the construction shown in FIGS. 2 and 3.

Figure 6:
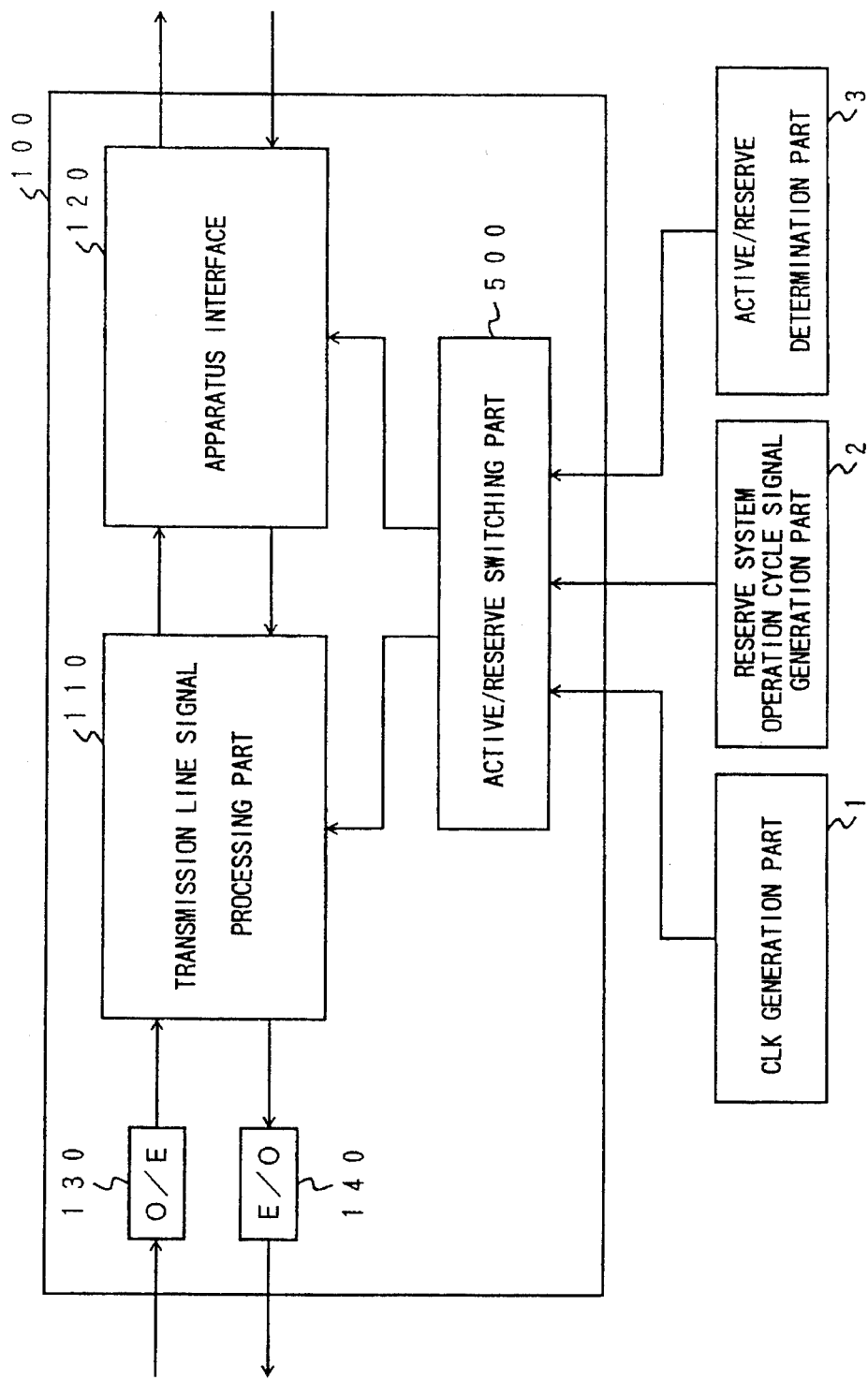
FIG. 6 is a diagram showing an outline of the transmission apparatus according to a first embodiment of the present invention.

FIG. 6 shows the outline of a first embodiment of the present invention. FIG. 6 shows only one optical interface board 100 because it can be used either in the active system or the reserve system in response to a determination signal from the active/reserve determination part 3.

The transmission apparatus having a redundant configuration shown in FIG. 6 has the clock generation part 1, the reserve system operation cycle signal generation part 2, the active/reserve determination part 3, and the optical interface board 100. The optical interface board 100 includes an active/reserve switching part 500, a transmission signal processing part 110 and an apparatus interface 120.

Figure 7:
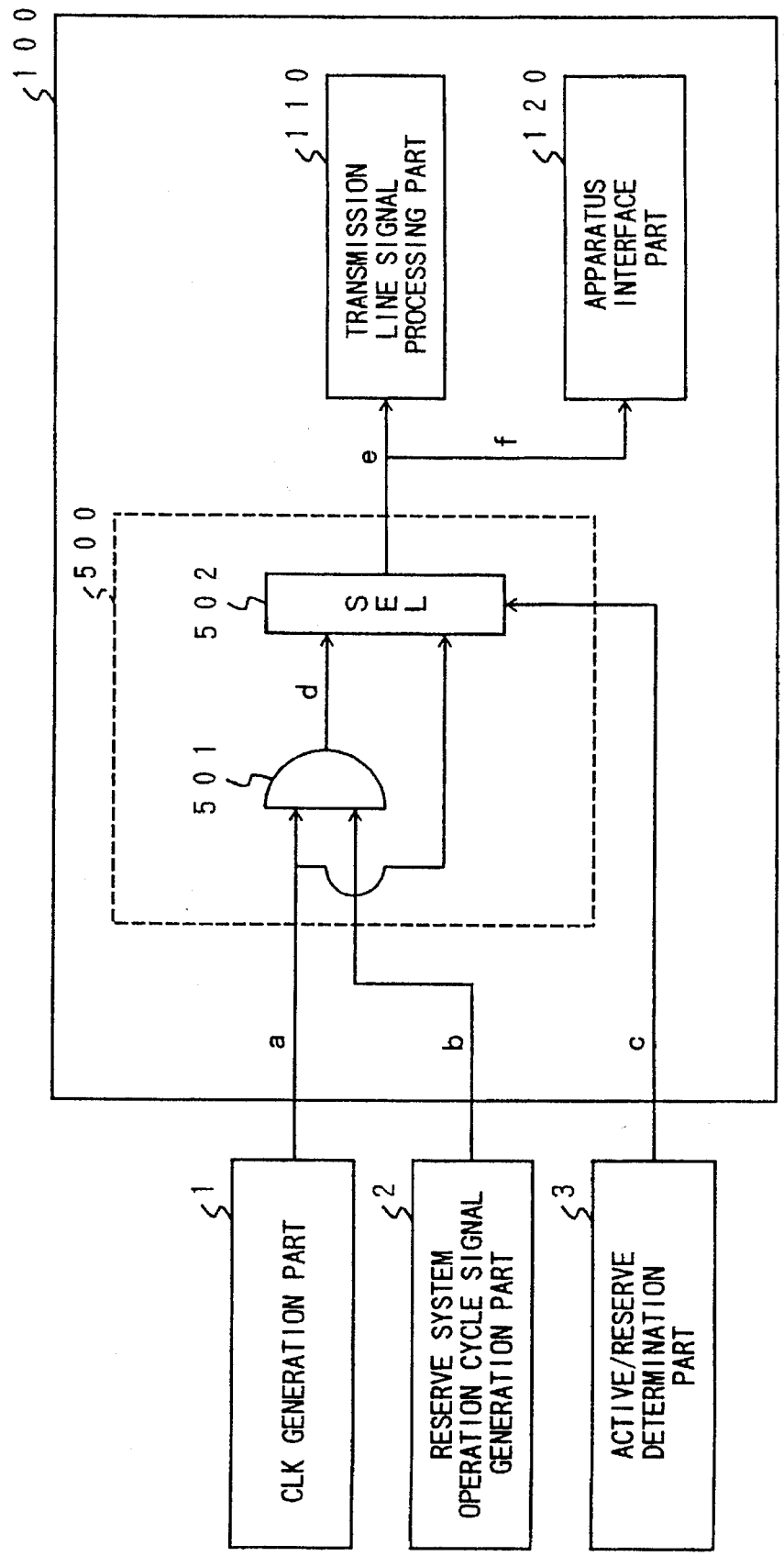
FIG. 7 is a diagram explaining the first embodiment of the present invention.

FIG. 7 explains the first embodiment. In FIG. 7, those components that are the same as the components of FIG. 6 are designated by the same reference numerals. The clock generation part 1 generates a clock signal a to be input to the active/reserve switching part 500 of the optical interface board 100. The reserve system operation cycle signal generation part 2 generates a cycle signal b which supplies a clock signal to the optical interface board 100 when the optical interface board 100 is used in the reserve system. The cycle signal b is supplied to the active/reserve switching part 500 of the optical interface board 100. The active/reserve determination part 3 determines whether the optical interface board 100 is to be used in the reserve system or the active system, and sends a determination result c to the active/reserve switching part 500 of the optical interface board 100. The active/reserve switching part 500 includes an AND circuit 501 and a selector 502.

FIG. 8 is a time chart of signals occurring in the first embodiment. The alphabetic labels of FIG. 8 correspond to the alphabetic labels of FIG. 7. The clock signal a generated by the clock generation part 1 and the cycle signal b generated by the reserve system operation cycle signal generation part 2 are input to the AND circuit 501. The AND circuit 501 ANDs the clock signal a and the cycle signal b, and sends a signal d obtained as a result of the operation to the selector 502.

The selector 502 receives as inputs the clock signal a generated by the clock generation part 1, the determination signal c from the active/reserve determination part 3, and the signal d obtained as a result of the AND operation. When the determination signal c output from the active/reserve determination part 3 indicates a "reserve", the selector 502 allows the transmission line signal processing part 110 and the apparatus interface 120 to be used in the reserve system, on the basis of the signal d, the clock signal a and the determination signal c. The selector 502 supplies a clock signal under the control of the cycle signal b. In the example of FIG. 8, the optical interface 100 is used in the active system when the determination signal c is at a high level. When the determination signal c is at a low level, the optical interface board 100 is used in the reserve system. Specifically, assuming that when the signal d is in the "ON" state, that the clock signal a is in the "ON" state, and that the determination signal c from the active/reserve determination part 3 indicates a "reserve", the optical interface board 100 is used in the reserve system, and the clock signals e and f are supplied to the transmission line signal processing part 110 and the apparatus interface 120.

Referring to FIG. 8, the clock signal a is generated regularly by the clock generation part 1, and is supplied to the AND circuit 501 and the selector 502. The cycle signal b generated by the reserve system operation cycle signal generation part 2 specifies the cycle during which the clock signal a is supplied. The signal d is generated at a timing when both the signal a and the signal b are input to the AND circuit 501. That is, the signal d is a condition signal for supplying a clock signal a to the transmission line signal processing part 110 and the apparatus interface 120 of the optical interface board 100, when the optical interface board 100 used in the reserve system. The clock signals e and f are sent at the same timing from the selector 502 to the transmission line signal processing part 110 and the apparatus interface 120, respectively.

The optical interface board 100 is used in the active system when the determination result of the active/reserve determination part 3 indicates "active". When the determination result indicates "reserve", the optical interface board 100 is used in the reserve system. Therefore, when the selector 502 receives as inputs the determination signal indicating the "active" determination from the active/reserve determination part 3 and the clock signal a generated by the clock generation part 1, the selector 502 supplies a clock signal to the transmission line signal processing part 110 and the apparatus interface 120 of the optical interface board 100, which is used in the active system. When the determination signal c indicating the "reserve" determination is input to the selector 502, and when the cycle signal b from the reserve system operation cycle signal generation part 2 and the clock signal a are input to the AND circuit 501 so as to output a signal d, the selector 502 supplies the clock signals e and f to the transmission line signal processing part 110 and the apparatus interface 120 of the reserve optical interface board 100, at intervals controlled by the cycle signal b.

As has been shown, the first embodiment ensures that the active interface board 100 carries out a normal transmission line signal processing, and that the reserve interface board 100 is supplied with the clock signal a from the clock generation part 1 during intervals in which the cycle signal b is input from the reserve system operation cycle signal generation part 2. Therefore, both the active optical interface board and the reserve optical interface board are operated only while the cycle signal b is supplied. While the cycle signal b is not supplied, the clock signal a is not supplied to the reserve optical interface board, thus reducing the power consumption of the optical interface boards.

A description will be given of a second embodiment of the present invention.

Figure 9:
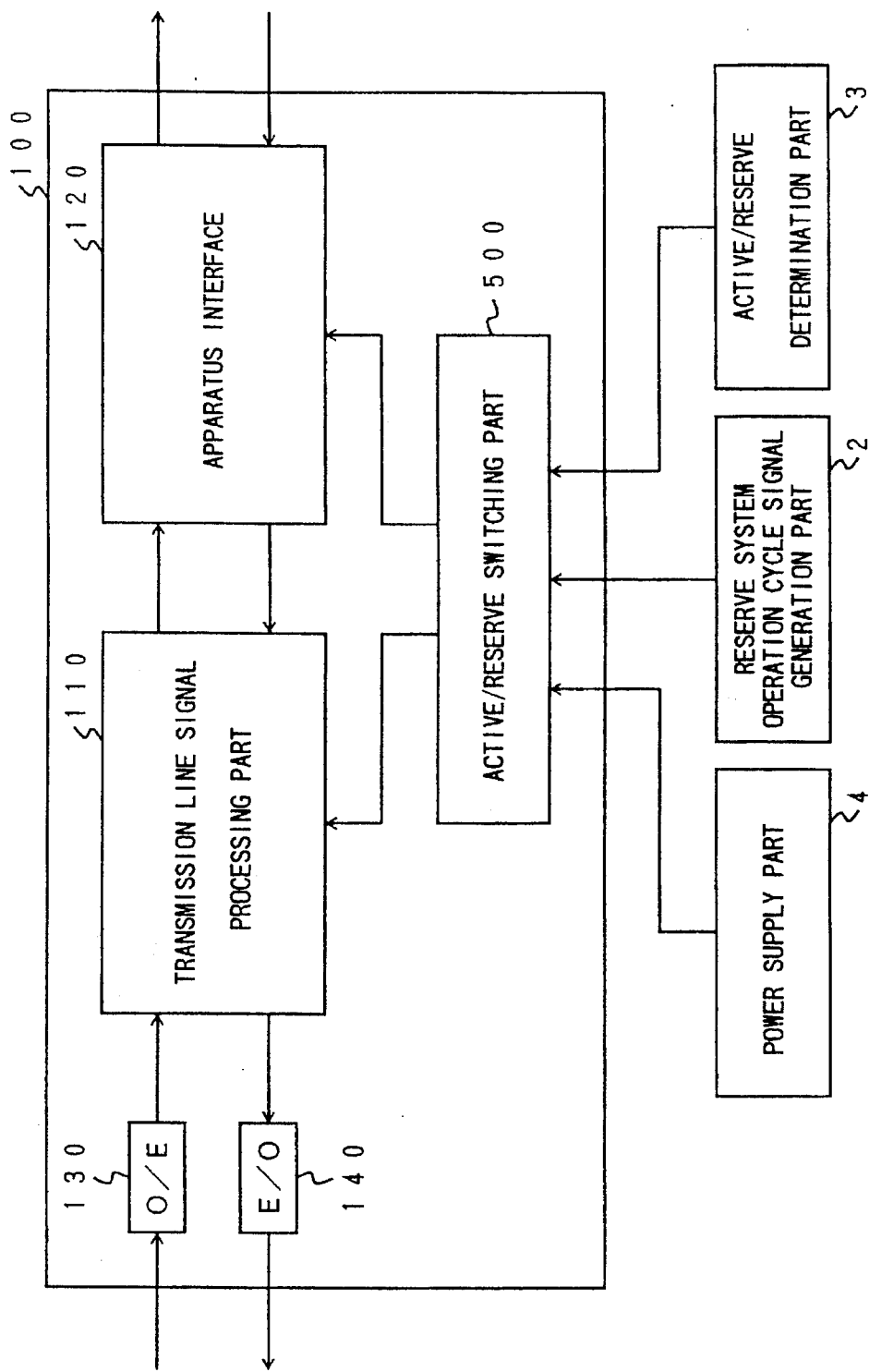
FIG. 9 is a diagram showing an outline of the transmission apparatus according to a second embodiment of the present invention.
Figure 10:
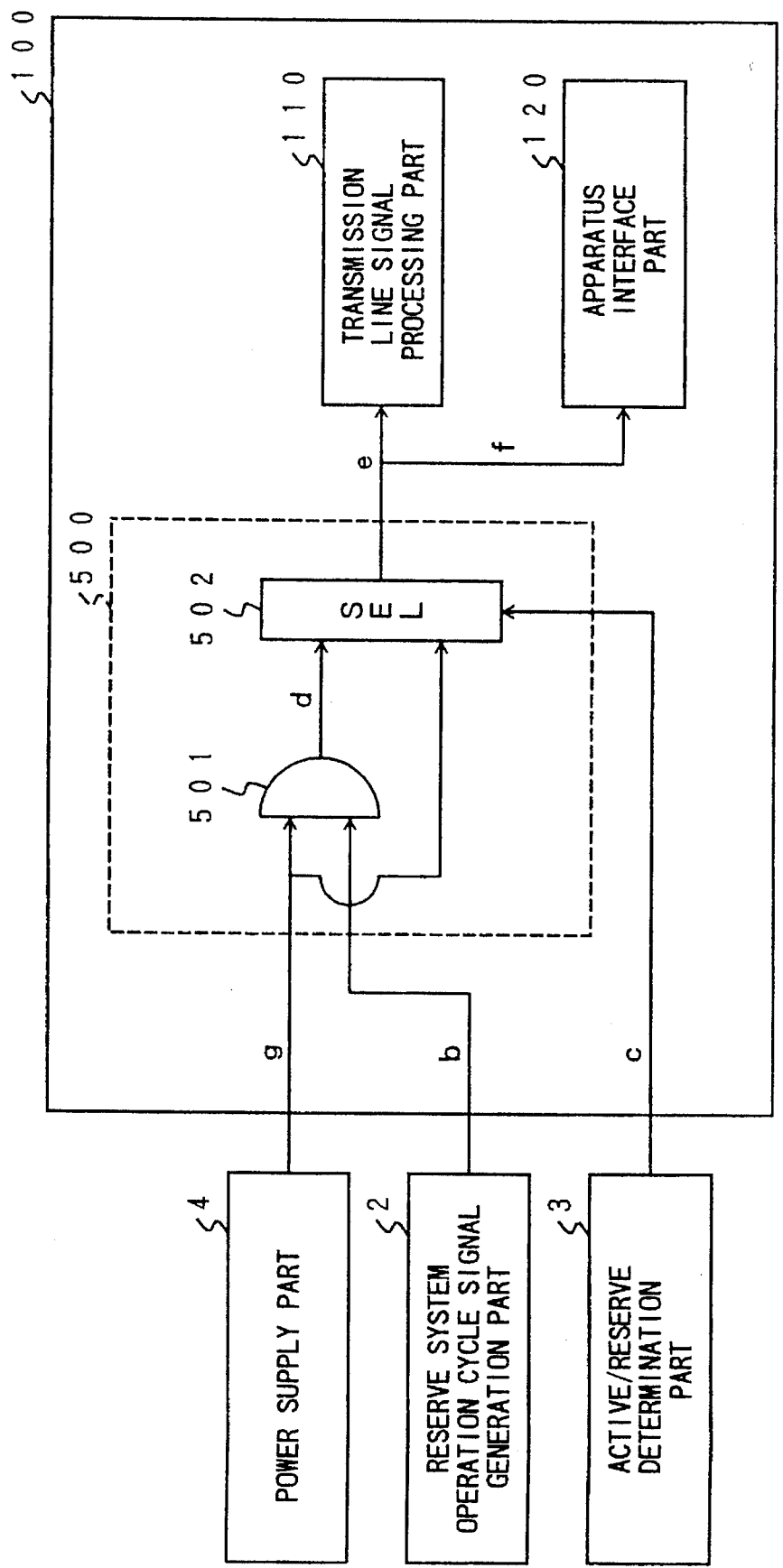
FIG. 10 is a diagram explaining the second embodiment of the present invention.

FIG. 9 shows the outline of the transmission apparatus according to the second embodiment. The construction of FIG. 9 is obtained by replacing the clock generation part 1 of FIG. 6 by the power supply part 4. FIG. 10 explains the second embodiment, and the construction thereof is obtained by replacing the clock generation part 1 of FIG. 7 by the power supply part 4. Referring to FIG. 10, when the determination signal c from the active/reserve determination part 3 indicates "active", the selector 502 constantly supplies the power g from the power supply part 4 to the transmission line signal processing part 110 and the apparatus interface 120 of the active optical interface board 100. When the determination signal c from the active/reserve determination part 3 indicates "reserve", the power g from the power supply part 4 and the cycle signal b from the reserve system operation cycle signal generation part 2 are input to the AND circuit 501. In this case, the AND circuit 501 feeds the signal d for operating the reserve system to the selector 502. When the determination signal c (indicating "reserve") and the signal d are input to the selector 502, the selector 502 turns on the power supply so that the powers e and f are supplied to the transmission line signal processing part 110 and the apparatus 120, respectively. The cycle at which the powers e and f are supplied corresponds to the cycle signal b output from the reserve system operation cycle signal generation part 2. Thus, both the active optical interface board and the reserve optical interface board are supplied with the power while the cycle signal b is supplied, and the reserve optical interface board is not supplied with the power while the cycle signal b is not supplied. Hence, the power consumption of the optical interface boards can be reduced.

A description will now be given of a third embodiment of the present invention.

Figure 11:
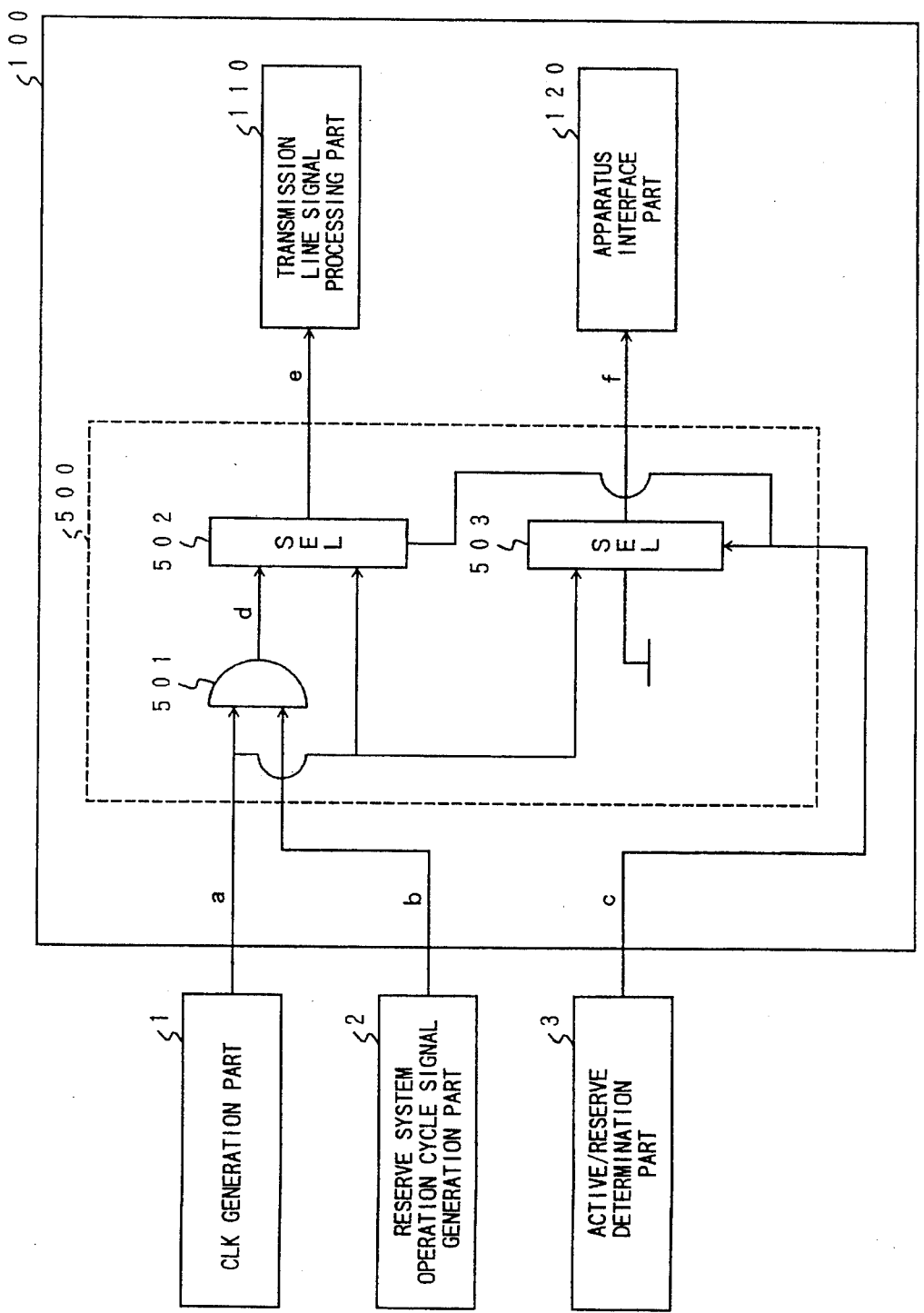
FIG. 11 is a diagram explaining a third embodiment of the present invention.

FIG. 11 explains the third embodiment of the present invention. The construction of FIG. 11 is obtained by adding a selector to the construction of FIG. 7 explaining the first embodiment. The clock generation part 1 sends the generated clock signal a not only to the AND circuit 501 but also to the selector 502 and a selector 503.

Referring to FIG. 11, when the determination result c of the active/reserve determination part 3 is "active", the selector 502 constantly supplies the clock signal e to the transmission line signal processing part 110 of the active optical interface board 100. The selector 503 constantly supplies the clock signal f to the apparatus interface 120 of the active system.

Figure 12:
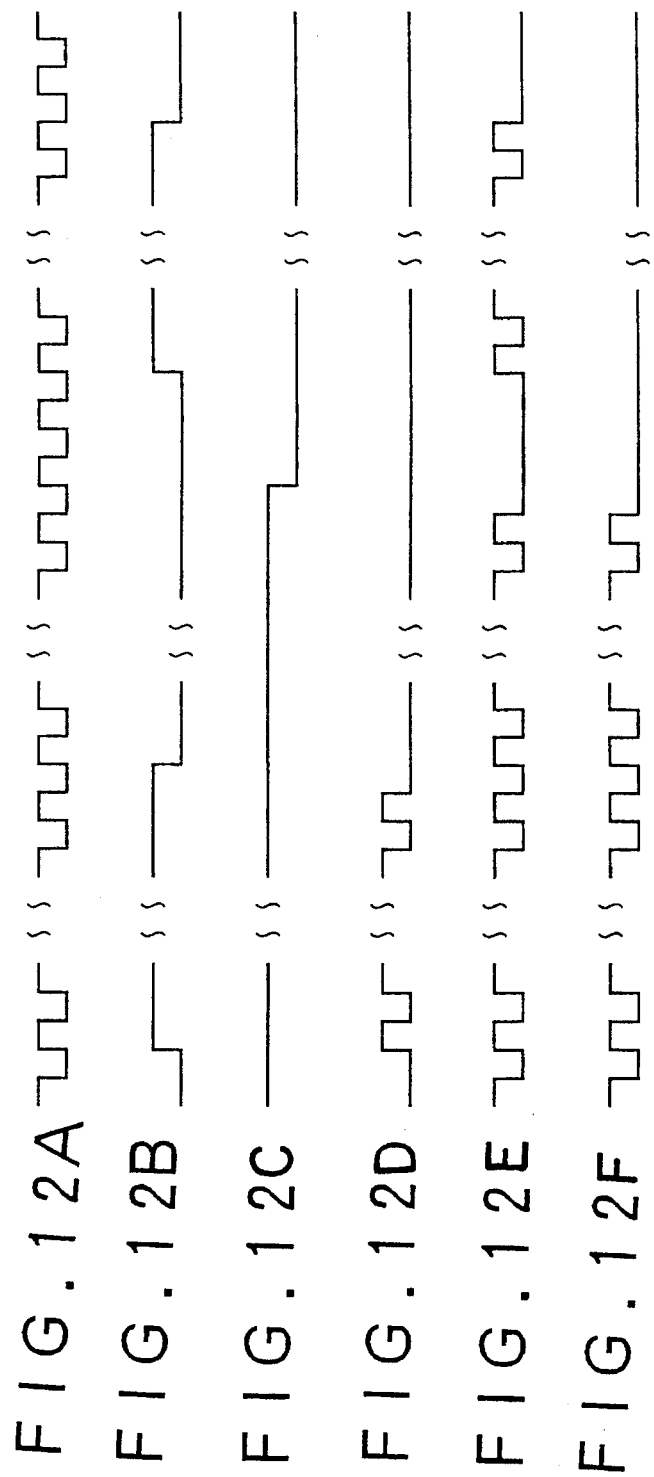
FIG. 12 is a time chart of signals occurring in the apparatus of the third embodiment.

When the determination result of the active/reserve determination part 3 is "reserve", the cycle signal h from the reserve system operation cycle signal generation part 2 and the clock signal a are input to the AND circuit 501. The AND circuit 501 ANDs the signal a and the signal b. When both the signals are input, the AND circuit 501 outputs the signal d. When the signal d from the AND circuit 501, the clock signal a and the signal c (indicating "reserve") are input to the selector 502, the selector 502 supplies the clock signal e to the transmission line signal processing part 110 of the reserve optical interface board 100 in correspondence with the cycle of the signal b. As indicated by f of FIG. 12, when the clock signal a and the signal c (indicating "reserve") are input to the selector 503, the selector 503 does not supply a clock signal to the apparatus interface 120.

As has been described above, the active optical interface board 100 is constantly supplied with a clock signal in order for normal transmission line signal processing to be carried out. The transmission line signal processing part 100 of the reserve optical interface board 100 is supplied with the clock signal a only at a predetermined cycle, and the clock signal a is not supplied to the apparatus interface 120.

Thus, the third embodiment ensures that, when the reserve system is selected by the active/reserve determination part 3, the clock signal a is supplied only to the reserve transmission line signal processing part 110, thereby reducing the power consumption to a greater degree than the first and second embodiments.

Figure 13:
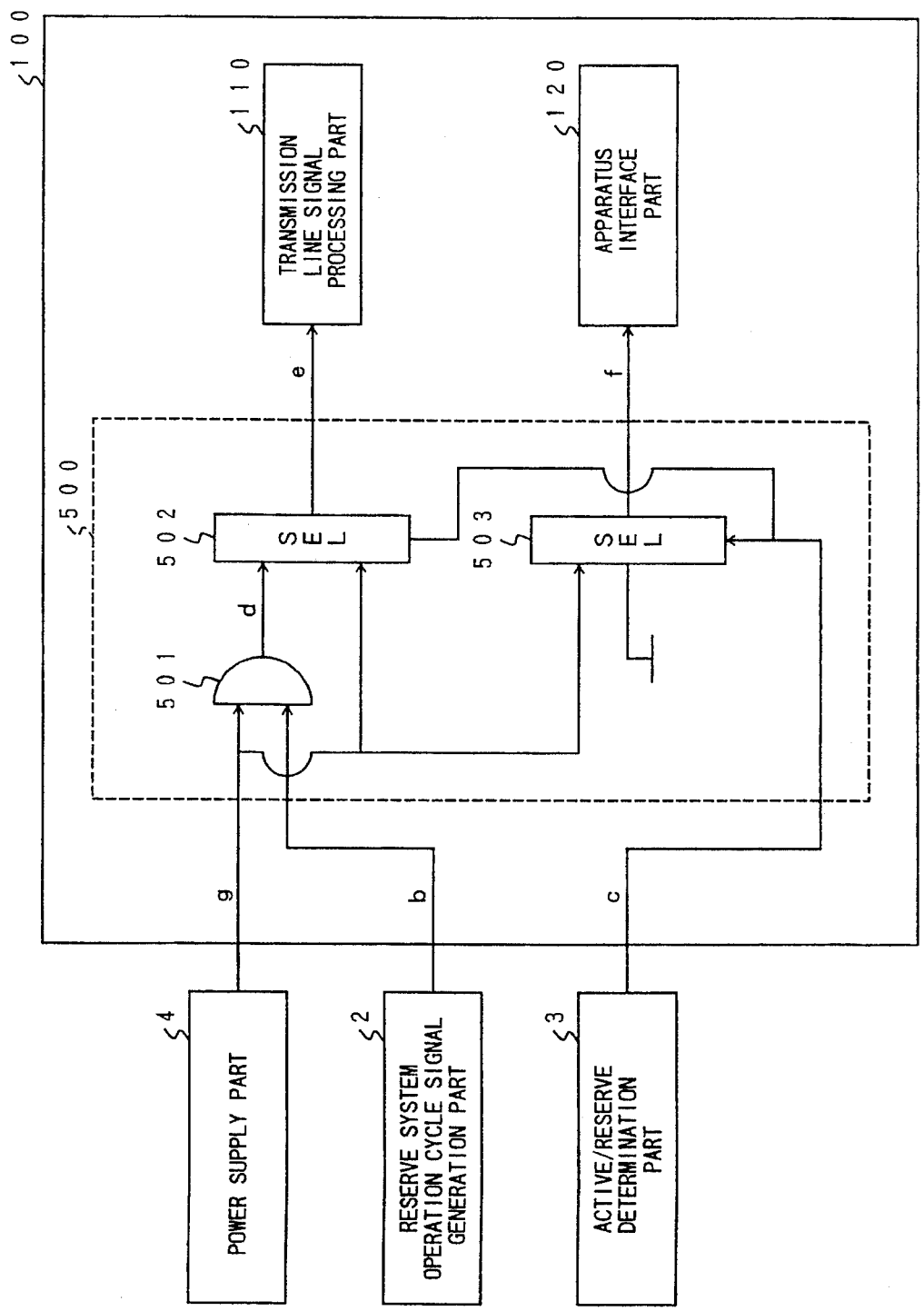
FIG. 13 is a diagram explaining a fourth embodiment of the present invention.

FIG. 13 explains a fourth embodiment of the present invention. The construction shown in FIG. 13 is obtained by replacing the clock generation part 1 of FIG. 11 by the power supply part 4. In this embodiment, when the signal output from the active/reserve determination part 3 indicates "active", the selector 502 constantly supplies the power to the transmission line signal processing part 110 of the active optical interface board 100, and the selector 503 constantly supplies the power to the apparatus interface 120. When the signal output from the active/reserve determination part 3 indicates "reserve", the selector 502 supplies power to the transmission line signal processing part 110 of the reserve optical interface board 100 in accordance with the cycle signal output from the reserve system operation cycle signal generation part 2. The selector 503 does not output anything to the apparatus interface 120.

Thus, the fourth embodiment ensures that, when the reserve system is selected by the active/reserve determination part 3, the power is supplied only to the transmission line signal processing part 110 of the reserve system, thereby reducing the power consumption to a greater degree than the first and second embodiments, like the third embodiment.

Figure 14:
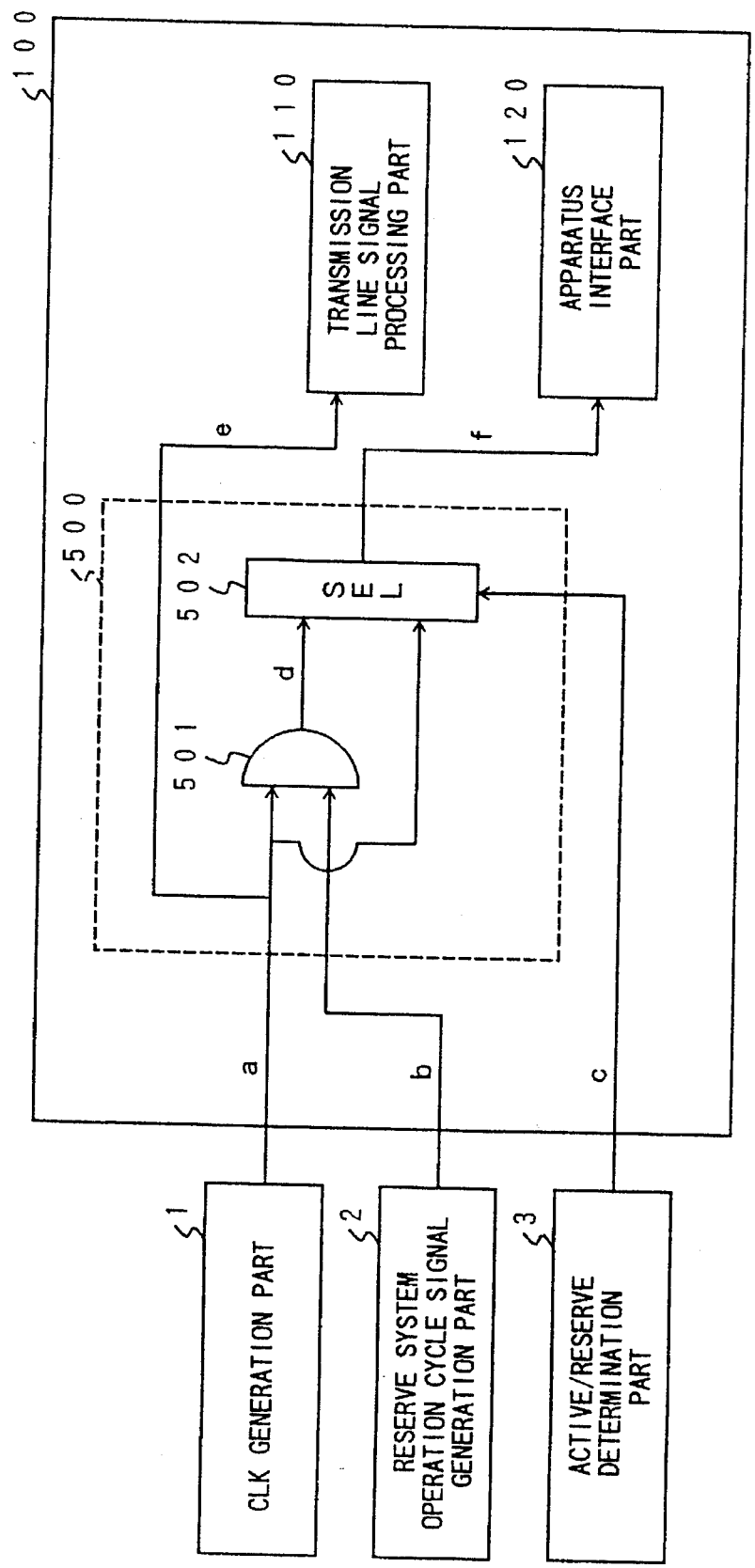
FIG. 14 is a diagram explaining a fifth embodiment of the present invention.

FIG. 14 explains a fifth embodiment of the present invention. The construction shown in FIG. 14 is essentially the same as the construction of the second embodiment, the difference being that, in the fifth embodiment, the clock signal from the clock generation part 1 is input directly to the transmission line signal processing part 110 as well as to the AND circuit 501 and the selector 502.

Figure 15:
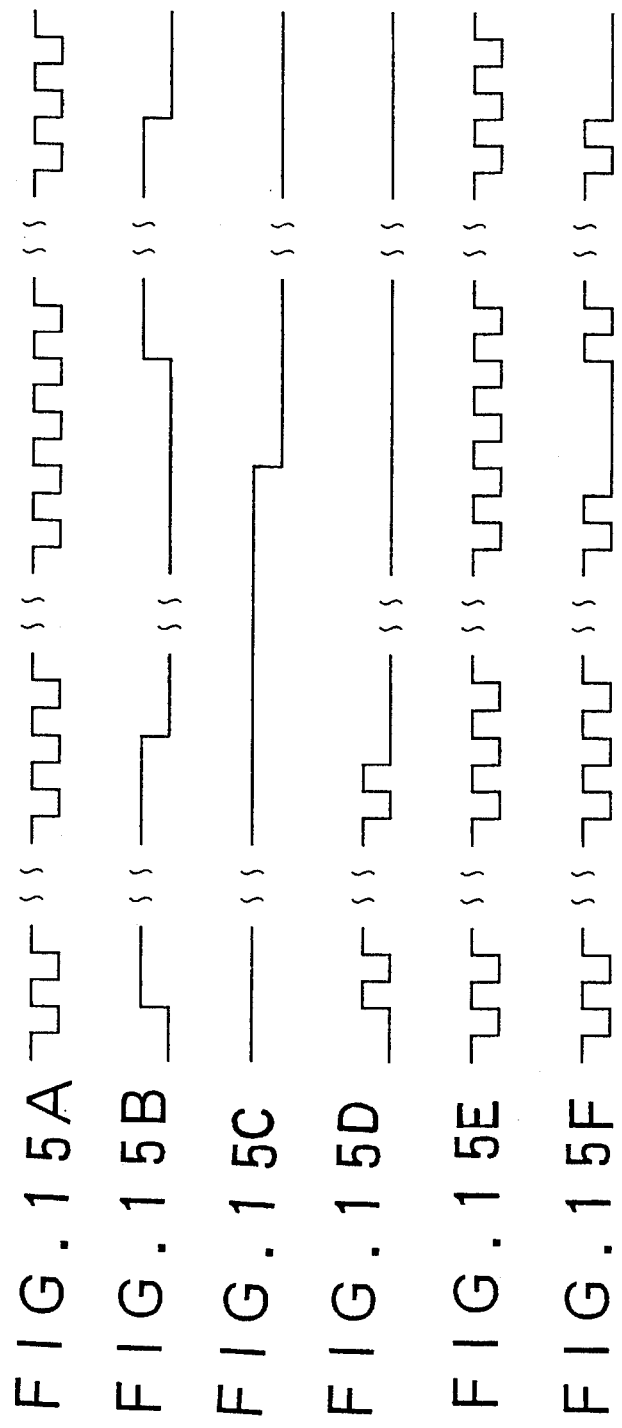
FIG. 15 is a time chart of signals occurring in the apparatus of the fifth embodiment of the present invention.

A description will be given of the operation of the construction shown in FIG. 14. FIG. 15 is a time chart of the fifth embodiment. The clock generation part 1 feeds the clock signal a to the AND circuit 501 and the selector 502. The clock signal is also input to the transmission line signal processing part 110. The clock signal input to the transmission signal processing part will be referred to as the clock signal e.

As shown in FIG. 15, the clock signal e is the signal which is produced to have the same timing as the clock signal a. Accordingly, the clock signal a is constantly supplied to the transmission line signal processing part 110 of the active optical interface board 100 and to the transmission line signal processing part 110 of the reserve optical interface board 100.

When the signal c from the active/reserve determination part 3 indicates "reserve", the AND circuit 501 ANDs the cycle signal b from the reserve system cycle signal generation part 2 and the clock signal a from the clock generation part 1, and outputs the signal d indicating the result of the operation to the selector 502. The selector 502 receives as inputs the signal d indicating the result of the operation, the clock signal a, and the signal c from the active/reserve determination part 3. When the determination signal c indicating "reserve" is input to the selector 502 from the active/reserve determination part 3, the selector 502 supplies the clock signal f to the apparatus interface 120, in accordance with the cycle signal b from the reserve system operation cycle signal generation part 2. As shown in FIG. 15, when the active/reserve determination signal c indicates "reserve" and the cycle signal b is in the "ON" state, then the signal f is in the "ON" state so that the apparatus interface 120 is supplied with the clock signal a.

Thus, the active optical interface board 100 is constantly supplied with the clock signal and performs normal transmission line signal processing. In the reserve optical interface board 100, only the transmission line signal processing part 110 is constantly supplied with the clock signal a so as to perform the signal processing. The apparatus interface 120 of the reserve optical interface board 100 is supplied with the clock signal at a regular cycle. This arrangement of the fifth embodiment, whereby the transmission line signal processing part 110 is constantly supplied with the clock signal, and the apparatus interface 120 is supplied with the clock signal at a regular cycle, ensures that the power consumption is reduced while the clock is not supplied to the apparatus interface 120, that is, while the operation thereof is halted.

Figure 16:
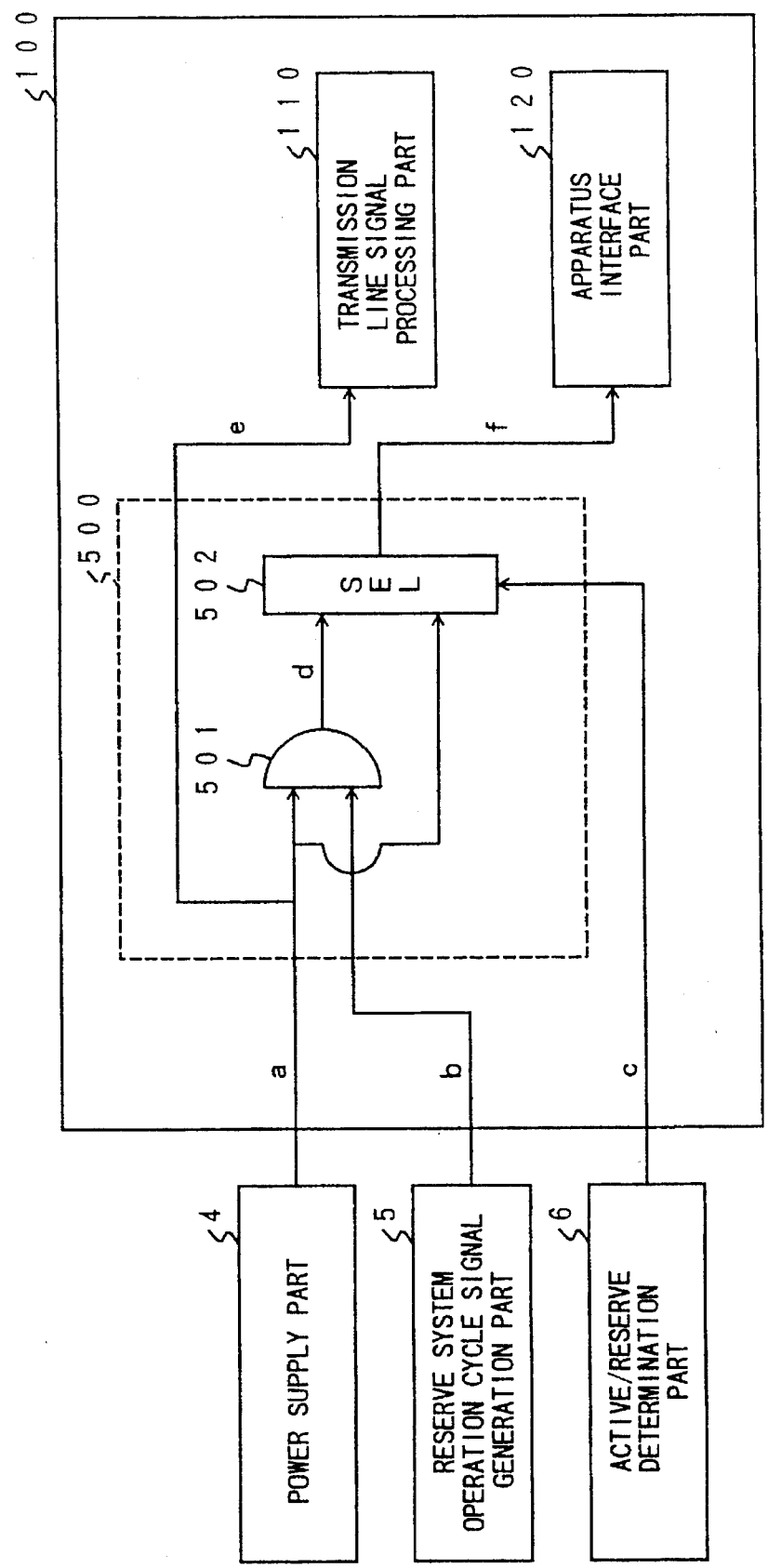
FIG. 16 is a time chart of signals occurring in the apparatus of the sixth embodiment of the present invention.

A description will now be given of a sixth embodiment. FIG. 16 explains the operation of the sixth embodiment. The construction of FIG. 16 is obtained by replacing the clock generation part 1 of FIG. 14 by the power supply part 4. Hence, the active optical interface board 100 performs normal transmission line signal processing. The transmission line signal processing part 110 of the reserve optical interface board 100 is constantly supplied with the power from the power supply part 4 so as to perform the signal processing. The apparatus interface 120 of the reserve optical interface board 100 is supplied with the power at a regular cycle in response to the "ON" state of the cycle signal from the reserve system operation cycle signal generation part 5. This arrangement of the sixth embodiment, whereby the transmission line signal processing part 110 is constantly supplied with the power, and the apparatus interface 120 is supplied with the power at a regular cycle, ensures that the power consumption is reduced while the power is not supplied to the apparatus interface 120, that is, while the operation thereof is halted.

In the first through sixth embodiments, the active/reserve switching part 500 may be so designed as to suit the intended purpose of each of the embodiments, and need not be limited to the combination of the AND circuit 501 and the selectors 502 and 503.

The present invention is not limited to the above described embodiments, and variations and modifications may be made without departing from the scope of the present invention.

What is claimed is:

1. A system of operating a transmission line having a redundant construction including a transmission line control apparatus formed of two interface boards, one interface board being used in an active system and the other being used in a reserve system, and each of the interface boards having transmission line signal processing means for processing a signal input via a transmission line or a reserve transmission line for implementing an interface between the interface board and a transmission apparatus, wherein:

said transmission control apparatus comprises active/reserve control means for supplying control signals to the interface boards for constantly supplying power to said active interface board in the active system, and for effecting control such that power is supplied at least to the transmission line signal processing means of said interface board in the reserve system, and each of said interface boards comprises power supply control means for switching the interface board to the active system or to the reserve system in response to a control action by said active/reserve control means, so that power is constantly supplied to said interface board switched to the active system, and so that power is supplied to at least the transmission line signal processing means of said interface board switched to the reserve system, wherein said active/reserve control means comprises an active/reserve determination part for determining whether to use the interface board in the active system or in the reserve system; clock generation means for generating a clock signal and for outputting the clock signal to the interface board; and a reserve system operation cycle signal generation part for outputting, when said active/reserve determination part yields a determination of "reserve", a cycle signal representing a predetermined cycle at which said clock signal is supplied to the interface board determined to be used in the reserve system; and wherein said power supply control means of the interface board supplies, when said active/reserve determination part yields a determination of "active", a clock signal output from said clock generation means to said transmission line signal processing means and said reserve transmission line of the interface board determined to be used in the active system, and supplies, when said active/reserve determination part yields a determination of "reserve", said clock signal to the interface board determined to be used in the reserve system, in accordance with said cycle signal output from said reserve system operation cycle signal generation part.

2. The system of operating a redundant transmission line as claimed in claim 1, wherein said power supply control means supplies, when said active/reserve determination part yields a determination of "active", a clock signal output from said clock generation means to said transmission line signal processing means and said reserve transmission line of the interface board determined to be used in the active system, and supplies, when said active/reserve determination part yields a determination of "reserve", said clock signal only to said transmission line signal processing part of the interface board determined to be used in the reserve system, in accordance with said cycle signal output from said reserve system operation cycle signal generation part, the clock signal not being supplied to said reserve transmission line.

3. The system of operating a redundant transmission line as claimed in claim 1, wherein said power supply control means supplies, when said active/reserve determination part yields a determination of "active", a clock signal output from said clock generation means to the interface board determined to be used in the active system, and supplies, when said active/reserve determination part yields a determination of "reserve", said clock signal to said transmission line signal processing part of the interface board determined to be used in the reserve system, while also supplying said clock signal to said reserve transmission line of said interface board determined to be used in the reserve system, in accordance with said cycle signal output from said reserve system operation cycle signal generation part.

4. A system of operating a transmission line having a redundant construction including a transmission line control apparatus formed of two interface boards, one interface board being used in an active system and the other being used in a reserve system, and each of the interface boards having transmission line signal processing means for processing a signal input via a transmission line or a reserve transmission line for implementing an interface between the interface board and a transmission apparatus, wherein:

said transmission control apparatus comprises active/reserve control means for supplying control signals to the interface boards for constantly supplying power to said active interface board in the active system, and for effecting control such that power is supplied at least to the transmission line signal processing means of said interface board in the reserve system, and each of said interface boards comprises power supply control means for switching the interface board to the active system or to the reserve system in response to a control action by said active/reserve control means, so that power is constantly supplied to said interface board switched to the active system, and so that power is supplied to at least the transmission line signal processing means of said interface board switched to the reserve system, and wherein said active/reserve control means comprises an active/reserve determination part for determining whether to use the interface board in the active system or in the reserve system; power supply means for supplying the power to the interface boards; and a reserve system operation cycle signal generation part for outputting, when said active/reserve determination part yields a determination of "reserve", a cycle signal representing a predetermined cycle at which said power is to be supplied to the interface board determined to be used in the reserve system; and wherein said power supply control means of the interface board supplies, when said active/reserve determination part yields a determination of "active", the power supplied by said power supply means to said transmission line signal processing means and said reserve transmission line of the interface board determined to be used in the active system, and supplies, when said active/reserve determination part yields a determination of "reserve", said power to the interface board determined to be used in the reserve system, in accordance with said cycle signal output from said reserve system operation cycle signal generation part.

5. The system of operating a redundant transmission line as claimed in claim 4, wherein said power supply control means supplies, when said active/reserve determination part yields a determination of "active", power supplied by said power supply to said transmission line signal processing means and said reserve transmission line of the interface board determined to be used in the active system, and supplies, when said active/reserve determination part yields a determination of "reserve", said power only to said transmission line signal processing part of the interface board determined to be used in the reserve system, in accordance with said cycle signal output from said reserve system operation cycle signal generation part, the power not being supplied to said reserve transmission line.

6. The system of operating a redundant transmission line as claimed in claim 4, wherein said power supply control means supplies, when said active/reserve determination part yields a determination of "active", the power supplied by said power supply means to the interface board determined to be used in the active system, and supplies, when said active/reserve determination part yields a determination of "reserve", said power to said transmission line signal processing part of the interface board determined to be used in the reserve system, while also supplying the power to said reserve transmission line of said interface board determined to be used in the reserve system, in accordance with said cycle signal output from said reserve system operation cycle signal generation part.

7. A method of operating a redundant transmission line using a transmission control apparatus having a redundant construction, wherein the power is constantly supplied to an active interface board which implements an interface between an active transmission line and a transmission apparatus, and the power is supplied to a reserve interface board which implements an interface between a reserve transmission line and a transmission apparatus, at a predetermined cycle.

8. The method of operating a redundant transmission line as claimed in claim 7, wherein the power is supplied in the form of a clock signal.

9. The method of operating a redundant transmission line as claimed in claim 7, wherein the power is supplied from a power source.

10. A method of operating a redundant transmission line using a transmission control apparatus having a redundant construction, wherein power is constantly supplied to an active interface board which implements an interface between an active transmission line and a transmission apparatus, and wherein power is normally supplied at a predetermined cycle to a transmission line signal processing part, for processing a signal from a transmission line, of a reserve interface board which implements an interface between a reserve transmission line and the transmission apparatus, the power not being supplied to parts other than said transmission line signal processing part.

11. The method of operating a redundant transmission line as claimed in claim 10, wherein the power is supplied in the form of a clock signal.

12. The method of operating a redundant transmission line as claimed in claim 10, wherein the power is supplied from a power source.

13. A method of operating a redundant transmission line using a transmission control apparatus having a redundant construction, wherein power is constantly supplied to an active interface board which implements an interface between an active transmission line and a transmission apparatus, and power is constantly supplied to a transmission line signal processing part of a reserve interface board which implements an interface between a reserve transmission line and a transmission apparatus, the power being supplied to a reserve transmission line of the reserve interface board at a predetermined cycle.

14. The method of operating a redundant transmission line as claimed in claim 13, wherein the power is supplied in the form of a clock signal.

15. The method of operating a redundant transmission line as claimed in claim 13, wherein the power is supplied from a power source.

* * * * *